US011790905B2

(12) United States Patent
Loganathan et al.

(10) Patent No.: US 11,790,905 B2
(45) Date of Patent: Oct. 17, 2023

(54) METHOD AND AN EQUIPMENT FOR CONFIGURING A SERVICE

(71) Applicant: Carrier Corporation, Palm Beach Gardens, FL (US)

(72) Inventors: Karthikeyan Loganathan, Telangana (IN); Akil Vivek Jalisatgi, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 196 days.

(21) Appl. No.: 17/113,826

(22) Filed: Dec. 7, 2020

(65) Prior Publication Data

US 2021/0183384 A1 Jun. 17, 2021

(51) Int. Cl.
*G10L 15/00* (2013.01)
*G10L 15/22* (2006.01)
*G10L 15/02* (2006.01)
*G10L 15/08* (2006.01)

(52) U.S. Cl.
CPC .............. *G10L 15/22* (2013.01); *G10L 15/02* (2013.01); *G10L 15/08* (2013.01)

(58) Field of Classification Search
CPC combination set(s) only.
See application file for complete search history.

(56) References Cited

U.S. PATENT DOCUMENTS

| 6,185,198 | B1 | 2/2001 | Ladue |
| 7,478,171 | B2 | 1/2009 | Ramaswamy et al. |
| 7,962,360 | B2 | 6/2011 | Mechaley et al. |
| 8,082,153 | B2 | 12/2011 | Coffman et al. |
| 8,418,168 | B2 | 4/2013 | Tyhurst et al. |
| 10,867,603 | B2 * | 12/2020 | Burgueno .......... H04N 21/4882 |
| 11,216,540 | B2 * | 1/2022 | Cierna .................... G06F 21/32 |
| 11,409,961 | B2 * | 8/2022 | Freeman ............... G06F 40/117 |
| 2014/0156281 | A1 * | 6/2014 | Boyd .................. H04L 12/2818 |
| | | | 704/275 |

(Continued)

FOREIGN PATENT DOCUMENTS

| JP | 2007511822 A | 5/2007 |
| JP | 2017535823 A | 11/2017 |

(Continued)

OTHER PUBLICATIONS

European Search Report for application EP 20210696.9, dated May 11, 2021, 9 pages.

*Primary Examiner* — Vu B Hang
(74) *Attorney, Agent, or Firm* — CANTOR COLBURN LLP

(57) ABSTRACT

An equipment and a method for configuring a service on an equipment. A method includes receiving a first voice input from a user to configure an equipment with a service. The equipment is configured with a voice-bot to interact with the user. The method also includes validating the first voice input, initiating configuration of the service and outputting a first voice response based on the validation of the first voice input. The method includes receiving a second voice input from the user in response to the first voice response and validating the second voice input. The method includes outputting a second voice response based on the validation of the second voice input and configuring the service on the equipment based on the voice inputs from the user.

18 Claims, 6 Drawing Sheets

(56) References Cited

U.S. PATENT DOCUMENTS

2014/0364056 A1  12/2014  Belk et al.
2016/0094360 A1   3/2016  Engelhardt et al.

FOREIGN PATENT DOCUMENTS

| WO | 0020962 A3 | 7/2000 |
| WO | 2004085622 A2 | 10/2004 |
| WO | 2006135758 A1 | 12/2006 |
| WO | 2016209489 A1 | 12/2016 |
| WO | 2019068203 A1 | 4/2019 |

* cited by examiner

METHOD AND AN EQUIPMENT FOR CONFIGURING A SERVICE

FOREIGN PRIORITY

This application claims priority to Indian Patent Application No. 201911051255, filed Dec. 11, 2019, and all the benefits accruing therefrom under 35 U.S.C. § 119, the contents of which in its entirety are herein incorporated by reference.

TECHNICAL FIELD

The present invention generally relates to equipment/s. More particularly, the invention relates to a system and a method for configuring a service on an equipment.

BACKGROUND

Programming or changing configuration of an equipment can be a complicated task. Whenever a user wants to program/configure an equipment, he/she should have knowledge about the basic functioning of the equipment and should know how the equipment can be programmed. Advanced knowledge about the functionality of the equipment is required and only experts can handle such operations or the user needs to be separately trained for executing the operations on the equipment. Such operations may include setting the equipment, installation of the equipment, configuring the equipment, configuring a service on the equipment, configuring a parameter of the service on the equipment or any such operation that can be performed on the equipment.

In order to perform an operation on the equipment, the user needs to contact a manufacturer or a dealer of the equipment to get assistance on the equipment from a technician. Sometimes, the technician is also not fully aware of each and every feature of the equipment which leads to failure in performing the operation on the equipment. In such a situation, the manufacturer or the dealer arranges another technician as per the nature of the operation to be performed on the equipment. This acts as an additional overhead for the manufacturer or the dealer of the equipment for arranging the technician who can perform the required operation on the equipment.

In view of the afore-mentioned problems in the existing solutions, there is a need of an efficient and effective system and a method for performing an operation on an equipment. There is also a need to provide a cost-effective solution for enabling a user to perform an operation on the equipment in an easy manner. In order to solve the problems in the existing solutions, an equipment and a method are disclosed.

SUMMARY

Various embodiments of the invention describe an equipment for configuring the equipment with a service. The equipment is configured with a voice-bot to interact with a user. The equipment comprises a receiver, a validation unit, an output unit and a configuration unit. The receiver is adapted to receive a first voice input from the user to configure the equipment with the service and the validation unit is adapted to validate the first voice input received from the user and initiate configuration of the service based on the validation of the first voice input. Also, the output unit is adapted to output a first voice response based on the validation of the first voice input for configuration of the service. Further, the receiver is adapted to receive a second voice input from the user in response to the first voice response and the validation unit is adapted to validate the second voice input received from the user. Moreover, the output unit is adapted to output a second voice response by the equipment based on the validation of the second voice input and the configuration unit is adapted to configure the service on the equipment based on the voice inputs from the user.

In an embodiment of the invention, the receiver is adapted to receive a third voice input from the user in response to the second voice response for configuration of the service. Also, the validation unit is adapted to validate the third voice input received from the user and the output unit is adapted to output a third voice response by the equipment based on the validation of the third voice input. Further, the receiver is adapted to receive a fourth voice input from the user in response to the third voice response and the validation unit is adapted to validate the fourth voice input received from the user. The output unit is adapted to output a fourth voice response by the equipment based on the validation of the fourth voice input. Moreover, the receiver is adapted to receive a fifth voice input from the user in response to the fourth voice response and the validation unit is adapted to validate the fifth voice input received from the user. The output unit is adapted to output a fifth voice response based on the validation of the fifth voice input and the configuration unit is adapted to configure the service on the equipment based on the third voice input, the fourth voice input and the fifth voice input.

In a different embodiment of the invention, the user provides the second voice input to configure a first parameter of the service, the third voice input to configure a second parameter of the service, the fourth voice input to configure a third parameter of the service and/or the fifth voice input to configure a fourth parameter of the service.

In an embodiment of the invention, the first parameter is related to an internet-protocol (IP) setting, the second parameter is related to a channel setting, the third parameter is related to a reporting setting and/or the fourth parameter is related to a test connection setting of the service.

In another embodiment of the invention, the first voice response, the second voice response, the third voice response, the fourth voice response and/or the fifth voice response are pre-defined voice labels configured in the equipment.

In yet another embodiment of the invention, the service configured on the equipment corresponds to a communication service.

In another embodiment of the invention, the user provides the first voice input, the second voice input, third voice input, the fourth voice input and/or the fifth voice input to an application stored in a user device, wherein the user device transmits the first voice input, the second voice input, third voice input, the fourth voice input and/or the fifth voice response to the equipment through a network.

In still another embodiment of the invention, the equipment provides a notification to the user or a vendor, an owner or a manufacturer regarding a status of configuring the equipment with the service. Also, the equipment authenticates the user before configuring the equipment with the service.

In a different embodiment of the invention, each of the voice response output by the equipment corresponds to a confirmation for configuring the service, a confirmation for configuring a parameter of the service, a message for invalid voice input, or a clarification for a voice input provided by the user.

In another embodiment of the invention, the voice-bot in the equipment is trained with pre-defined classifiers to determine a service and/or a parameter for configuration based on a voice input provided by the user.

In an embodiment of the invention, the voice-bot in the equipment is configured to output each of the voice responses by determining a pattern based on each of the voice inputs provided by the user.

In another embodiment of the invention, each of the voice input-voice response corresponds to a hierarchical voice input-voice response for configuring the service. Further, the equipment receives "n" number of voice inputs from the user and outputs "n" number of voice responses to configure the service.

Various embodiments of the invention describe a method for configuring the equipment with a service. The method comprises steps of receiving a first voice input from a user to configure an equipment with a service. The equipment configured with a voice-bot to interact with the user. The method also comprises steps of validating the first voice input received from the user and initiating configuration of the service based on the validation of the first voice input and outputting a first voice response based on the validation of the first voice input for configuration of the service. The method further comprises steps of receiving a second voice input from the user in response to the first voice response and validating the second voice input received from the user. The method comprises steps of outputting a second voice response by the equipment based on the validation of the second voice input and configuring the service on the equipment based on the voice inputs from the user.

In an embodiment of the invention, the method further comprises steps of receiving a third voice input from the user in response to the second voice response for configuration of the service, validating the third voice input received from the user, and outputting a third voice response by the equipment based on the validation of the third voice input. The method further comprises steps of receiving a fourth voice input from the user in response to the third voice response, validating the fourth voice input received from the user and outputting a fourth voice response by the equipment based on the validation of the fourth voice input. The method further comprises steps of receiving a fifth voice input from the user in response to the fourth voice response, validating the fifth voice input received from the user and outputting a fifth voice response based on the validation of the fifth voice input. Accordingly, the service is configured on the equipment based on the third voice input, the fourth voice input and the fifth voice input.

In a different embodiment of the invention, the user provides the second voice input to configure a first parameter of the service, the third voice input to configure a second parameter of the service, the fourth voice input to configure a third parameter of the service and/or the fifth voice input to configure a fourth parameter of the service.

In an embodiment of the invention, the first parameter is related to an internet-protocol (IP) setting, the second parameter is related to a channel setting, the third parameter is related to a reporting setting and/or the fourth parameter is related to a test connection setting of the service.

In another embodiment of the invention, each of the voice input-voice response corresponds to a hierarchical voice input-voice response for configuring the service.

In another different embodiment of the invention, a computer readable medium is disclosed for configuring an equipment with a service. The computer readable medium comprises one or more processors and a memory is coupled to the one or more processors, the memory stores instructions executed by the one or more processors. The one or more processors are configured to receive a first voice input from a user to configure an equipment with a service. Also, the equipment configured with a voice-bot to interact with the user. The one or more processors are further configured to validate the first voice input received from the user and initiate configuration of the service based on the validation of the first voice input and output a first voice response based on the validation of the first voice input for configuration of the service. The one or more processors are also configured to receive a second voice input from the user in response to the first voice response, validate the second voice input received from the user and output a second voice response by the equipment based on the validation of the second voice input. The one or more processors are configured to configure the service on the equipment based on the first voice input and the second voice input from the user.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION

Figure 1A:
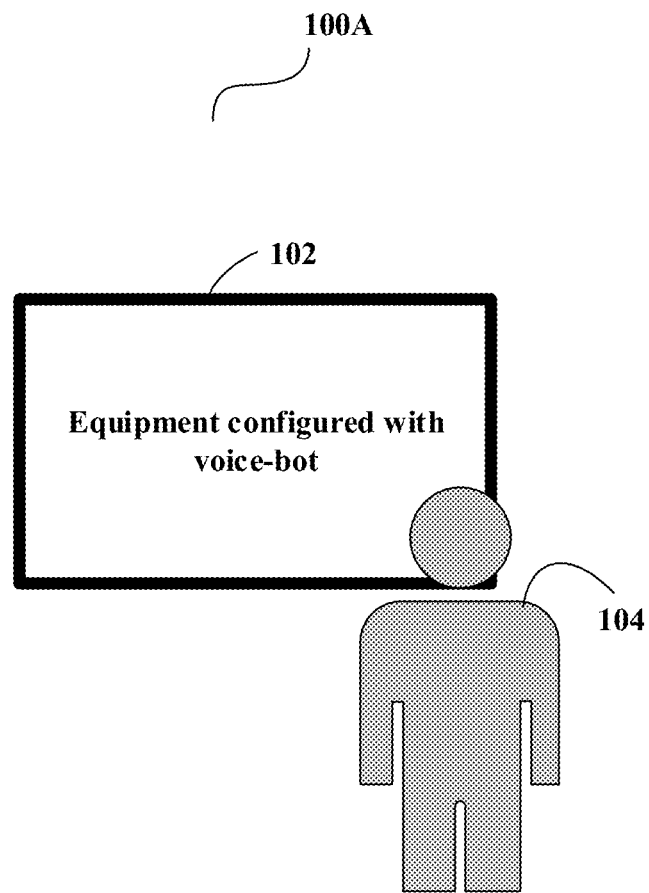
FIG. 1A depicts an exemplary system architecture according to an exemplary embodiment of the invention.

Described herein is the technology with an equipment and a method for configuring the equipment with a service through bi-directional voice interaction between a user and the equipment. The equipment may be configured with a voice-bot to interact with the user and the user may interact with the voice-bot of the equipment to configure the service on the equipment. In particular, the user may provide voice input/s to the equipment for configuring the service on the equipment and in turn, the equipment may output voice response/s to the user based on validation of the voice input/s received from the user. Accordingly, the service may be configured on the equipment based on the voice input/s received from the user.

In an alternative exemplary embodiment, the user may interact with an application (with a voice-bot) stored in a user device to configure the service on the equipment. The user may provide voice input/s to the user device for configuring the service on the equipment and in turn, the user device may transmit the voice input/s (may be, in form of a configuration file) to the equipment through a network. When the equipment receives the configuration file, the equipment accordingly configures the service on the equipment.

As used herein, the equipment may be any device, any appliance, or any apparatus with a voice-bot that can be used to configure a service on the equipment. The equipment may also have an internet capability to interact with other devices or a server. Such an equipment may be a television (TV), a camera, a mobile device, set-top box, a chiller equipment, an air conditioner, a washing machine, an elevator, a desktop, a lock, commercial and residential heating, ventilation, and air conditioning (HVAC) equipment/s, refrigeration, fire equipment/s, security equipment/s, a water coolers/heaters, a microwave, an electric motor, an electronic device, or any such equipment that is well known in the art.

As used herein, the service may be configured on the equipment through a bi-directional voice interaction between the user and the equipment. The service may also be an operation that can be performed on the equipment using the voice-bot. The configuration of the service on the equipment may involve configuration of parameter/s on the equipment. Such a service may be a commissioning service, an installation service, an un-installation service, an error checking service, a configuration service, a upgrade service, a reporting service, a communication service, a feature setting service, a setting service, a calibration service or any such service that is understood by a person skilled in the art.

As used herein, the user device may be connected with the equipment through a network and have an internet capability. The user device may also store an application having a voice-bot to interact with the user. Example of the user device may include a desktop, workstation PC, a laptop, a smart phone, a tablet, a wearable device and the like.

As used herein, the network may refer to a cellular network (such as Global System for Mobile (GSM) network, a Long-Term Evolution (LTE) network, a code-division multiple access (CDMA) network, a narrow-band internet of thing (NB-IoT) technique or category M1 technique)), a WiFi network, a ZigBee network or any such network/technique that is known in the art.

FIG. 1A depicts an exemplary system architecture 100A according to an exemplary embodiment of the invention. As depicted in FIG. 1A, an equipment 102 is configured with a voice-bot to interact with a user 104. The user 104 may provide voice input/s to the equipment 102 for configuring the equipment 102 with a service. On receiving the voice input/s, the equipment 102 may validate the voice input/s. For validation, the equipment 102 may determine a voice pattern based on each of the voice input/s provided by the user 104. To determine the voice pattern, the equipment 102 may compare the voice input/s with a pre-defined classifiers. The equipment 102 may be trained with the pre-defined classifiers having pre-defined voice input/s (or pre-defined voice labels). A matching between the voice input/s provided by the user 104 and the pre-defined classifiers is determined. Based on the matching, one or more classes may be assigned to the voice input/s provided by the user 104. Also, each of the one or more classes may be assigned a score based on the matching. In an exemplary embodiment, the equipment 102 may use multinomial naive bayes technique for classification based on the voice pattern known to a person skilled in the art. For an instance, a class may be assigned highest score when the matching between the voice input/s provided by the user 104 and the pre-defined classifiers is maximum. Similarly, a class may be assigned lowest score when the matching between the voice input/s provided by the user 104 and the pre-defined classifiers is minimum. In such a case, the class with the highest score may be considered for validating the voice input/s. Once the voice input/s is validated and the pattern is determined, the equipment 102 may identify a suitable voice response for each of the voice input/s provided by the user 104. This embodiment of the invention provides technical advantage of easy configuration of an equipment without having knowledge of the equipment or any knowledge about the functionality of the equipment.

Based on the voice response from the equipment 102, the user 104 may provide another voice input to the equipment 102. Depending upon the service to be configured, the equipment 102 may receive any number (or "n number") of voice inputs from the user 104 and may output any number (or "n number") of voice responses in the bi-directional interaction. For more clarity on the configuration of the service on the equipment 102, an exemplary communication service and chiller controller configuring service have been explained in FIG. 1C and FIG. 1D which is to be configured on the equipment 102. This embodiment of the invention provides technical advantages of enabling a physically-handicapped person to configure an equipment with ease. This embodiment of the invention also provides technical advantages of enabling an untrained person to configure an equipment.

Figure 1B:
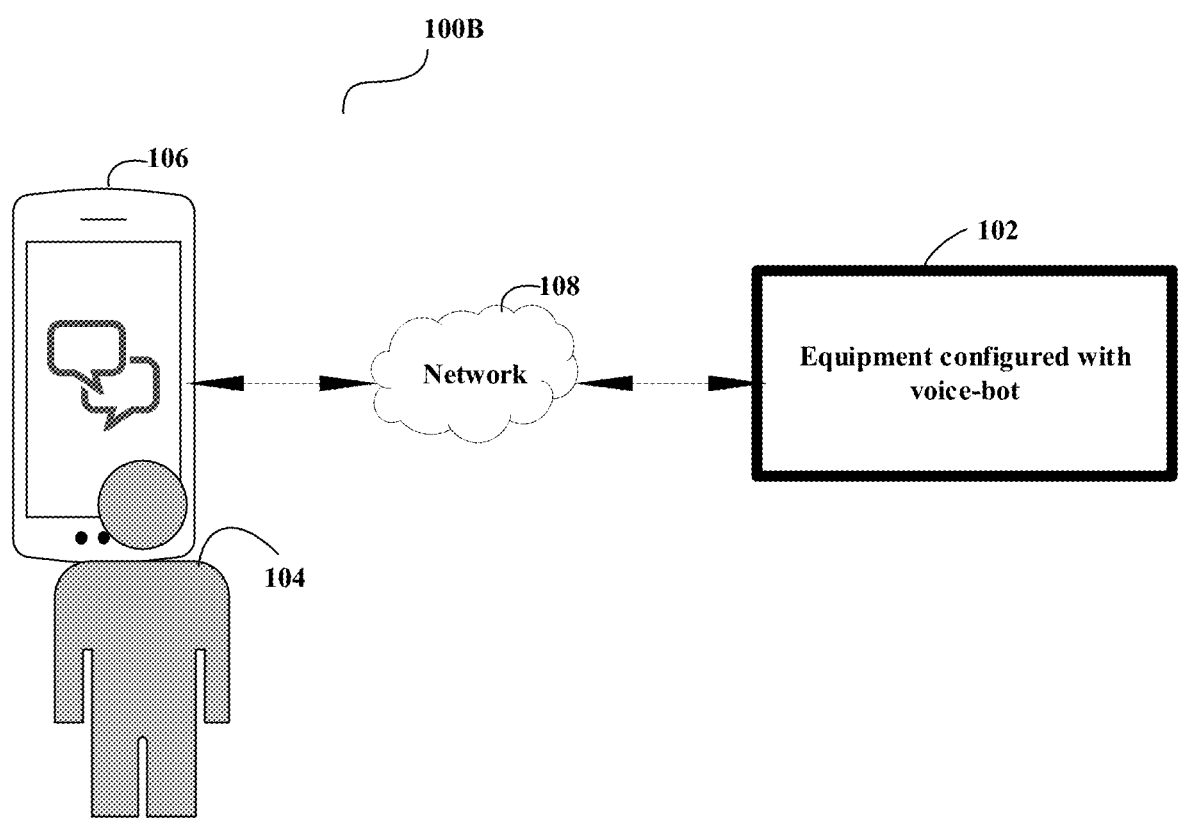
FIG. 1B depicts an exemplary system architecture according to an exemplary alternative embodiment of the invention.

FIG. 1B depicts an exemplary system architecture 100B according to an exemplary embodiment of the invention. As depicted in FIG. 1B, an equipment 102 configured with a voice-bot and a user 104 with a user device 106. Further, the equipment 102 and the user device 106 may communicate with each other through a network 108. The user device 106 may have an application stored in a memory of the user device 106 and the application may also have a voice-bot integrated in the application. The user 104 may provide "n" number of voice input/s to the user device 106 to configure the equipment 102 with a service. The user device 106 may validate the voice input/s provided by the user 104 and based on the validation, the user device 106 may output "n" number of voice response/s. Also, the user device 106 may transmit the voice input/s (as a configuration file) to the equipment 102 through the network 108.

When the equipment 102 receives the voice input/s (as the configuration file) from the user device 106, the equipment 102 may configure a parameter of the service or the service on the equipment 102. In addition, the equipment 102 may also output voice response/s (as another configuration file) in response to the configuration file received from the user device 106. The equipment 102 may transmit the another configuration file to the user device 106. In this way, the equipment 102 and the user device 106 may communicate for remotely configuring the parameter of the service or the service on the equipment 102. This embodiment of the invention provides technical advantages of saving cost of the dealer and manufacturer for arranging technician to configure an equipment by preventing the user to physically visit the place.

The present invention also encompasses the equipment 102 to authenticate the user 104 before configuring the equipment 102 with any service. For this, the user 104 may perform one-time authorization with the equipment 102. The equipment 102 may store an identifier associated with the user 104 in a memory. Such an identifier may be voice identifier, a biometric identifier, and/or any a unique code associated with the user 104. When or before the user 104 provides a first voice input to the equipment 102, the equipment 102 may authenticate the user 104 by asking the user 104 to provide/input an identifier associated with the user 104 or to login using credentials. Then, the equipment 102 may compare the identifier inputted by the user 104 with the stored identifier in the memory. If the identifier inputted by the user 104 matches with the stored identifier, then, the equipment 102 authenticates the user 104. Otherwise, the equipment 102 does not authenticate the user 104. Any type of the user 104 such as an operator, a user, a technician, a supervisor, an administrator, or an owner of the equipment 102 may perform one-time authorization with the equipment 102. Based on the type of the user 104, different levels of rights and privileges may be provided to the user 104 for configuring a parameter of the service or the service on the equipment 102. It may be noted that the authentication may be one-time authentication or multiple times authentication.

Figure 1C:
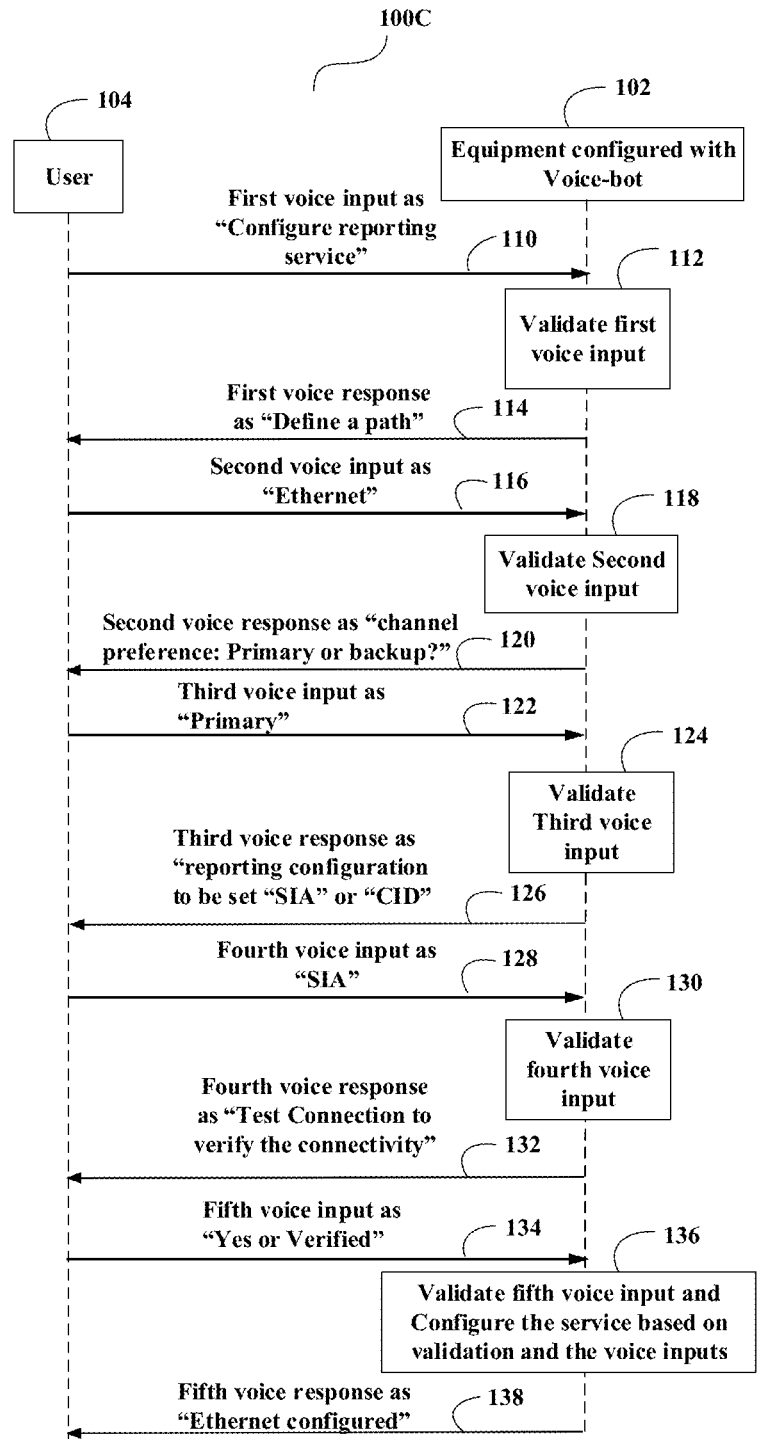
FIG. 1C depicts an exemplary signaling diagram for an exemplary communication service to be configured on an equipment according to an exemplary embodiment of the invention.

FIG. 1C depicts an exemplary signaling diagram 100C for an exemplary communication service to be configured on the equipment 102 according to an exemplary embodiment of the invention.

At step 110, the user 104 may provide a first voice input as "Configure communication service" to the equipment 102. At step 112, the equipment 102 may validate the first voice input received from the user 104 as explained above in FIG. 1A.

At step 114, if the first voice input is valid, the equipment 102 may output a first voice response as "Define a path" for configuring the service. Herein, the equipment 102 may also provide options to the user 104 through the voice response such as "Define a path from a list provided on a display" or "Define a path from an Ethernet, a Wi-Fi or a Cellular?". If the first voice input is valid, the equipment 102 may initiate configuration of the service. And, if the first voice input is not valid, the equipment 102 may notify the user 104 regarding the invalid voice input through the first voice response.

At step 116, the user 104 may provide a second voice input as "Ethernet" in response to the first voice response (i.e. by choosing an option provided to the user 104). Further, the user 104 may provide the second voice input to configure a first parameter of the service. Also, the first parameter may be related to an internet-protocol (IP) setting of the service i.e. Ethernet setting. At step 118, the equipment 102 may validate the second voice input received from the user 104 as explained above in FIG. 1A.

At step 120, if the second voice input is valid, the equipment 102 may output a second voice response as "Channel preference: Primary or Back-up?". The equipment 102 may also fetch an internet-protocol (IP) address and may also request the user 104 to connect the equipment 102 to a router via a cable (may be a CAT5 cable). And, if the second voice input is not valid, the equipment 102 may notify the user 104 regarding the invalid voice input through the second voice response.

At step 122, the user 104 may provide a third voice input as "Primary" for Ethernet communication in response to the second voice response (i.e. by clarifying to the equipment 102 for choosing the option of "Primary channel"). Further, the user 104 may provide the third voice input to configure a second parameter of the service. Also, the second parameter may be related to a channel setting of the service i.e. Primary Channel. At step 124, the equipment 102 may receive the third voice input from the user 104 and may validate the third voice input as explained in FIG. 1A above.

At step 126, if the third voice input is valid, the equipment 102 may output a third voice response as "Reporting configuration to be set "SIA (or Security Industry Association)" or "CID (Or Contact ID)"?". And, if the third voice input is not valid, the equipment 102 may notify the user 104 regarding the invalid voice input through the third voice response.

At step 128, the user 104 may provide a fourth voice input as "SIA" in response to the third voice response (i.e. clarifying to the equipment 102 for choosing the option of "SIA"). Further, the user 104 may provide the fourth voice input to configure a third parameter of the service. Also, the third parameter may be related to a reporting setting of the service i.e. SIA setting. At step 130, the equipment 102 may receive the fourth voice input from the user 104 and may validate the fourth voice input as explained above in FIG. 1A.

At step 132, if the fourth voice input is valid, the equipment 102 may output a fourth voice response as "Test Connection to verify the connectivity?". And, if the fourth voice input is not valid, the equipment 102 may notify the user 104 regarding the invalid voice input through the fourth voice response.

At step 134, the user 104 may provide a fifth voice input as "Yes or Verified" in response to the fourth voice response. Further, the user 104 may provide the fifth voice input to configure a fourth parameter of the service. Also, the fourth parameter may be related to a test connection setting of the service i.e. to confirm verification of the testing. At step 136, the equipment 102 may receive the fifth voice input from the user 104 and may validate the fifth voice input as explained above in FIG. 1A.

At step 138, if the fifth voice input is valid, the equipment 102 may configure the communication service on the equipment 102 based on the fifth voice input and may output a fifth voice response as "Ethernet configured". And, if the fifth voice input is not valid, the equipment 102 may notify the user 104 regarding the invalid voice input through the fifth voice response.

Figure 1D:
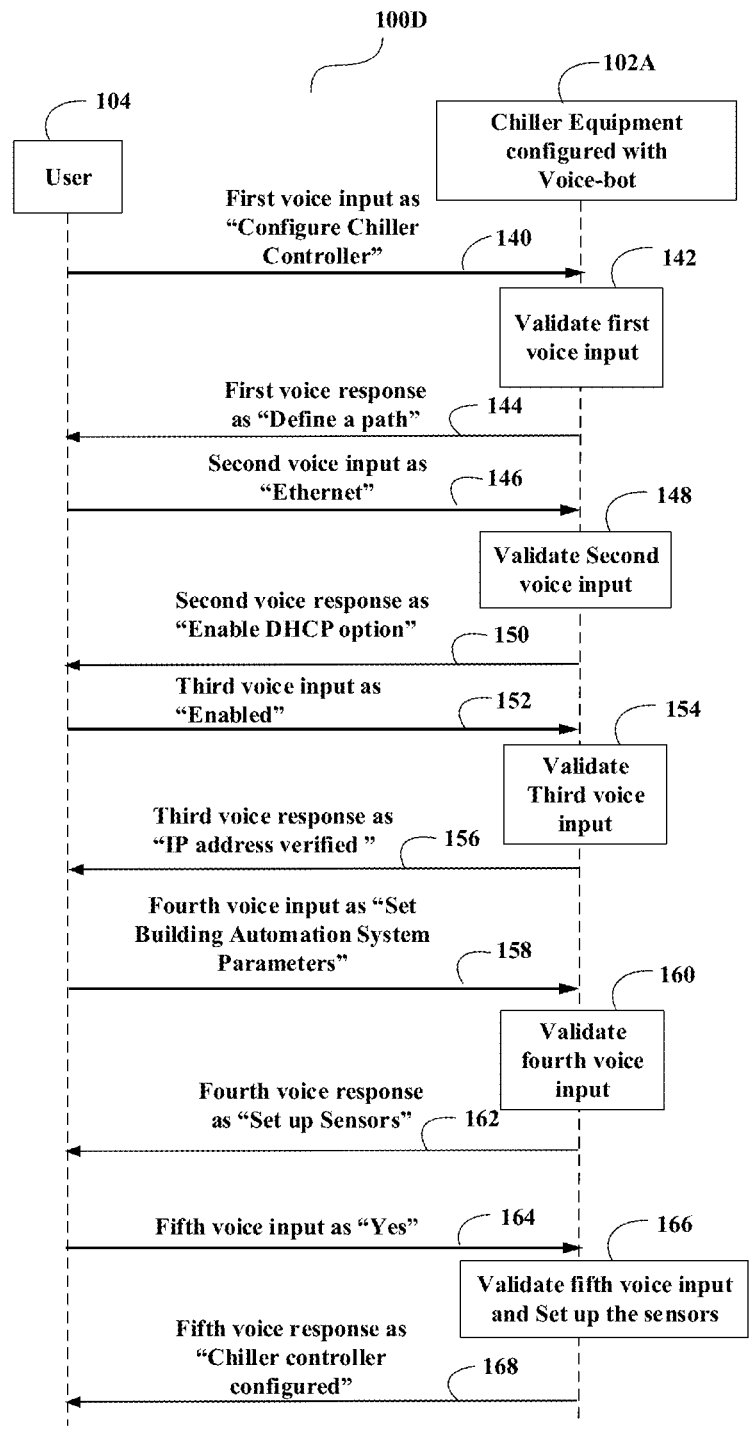
FIG. 1D depicts an exemplary signaling diagram for an exemplary chiller controller to be configured on a chiller equipment according to an exemplary embodiment of the invention.

FIG. 1D depicts an exemplary signaling diagram 100D for an exemplary configuring service of a chiller controller to be configured on a chiller equipment 102A according to an exemplary embodiment of the invention. The chiller equipment 102A may be configured with a voice-bot to interact with the user 104.

At step 140, the user 104 may provide a first voice input as "Configure chiller controller" to the chiller equipment 102A. At step 142, the chiller equipment 102A may validate the first voice input received from the user 104 as explained above in FIG. 1A.

At step 144, if the first voice input is valid, the chiller equipment 102A may output a first voice response as "Define a path" for configuring the chiller controller. Herein, the chiller equipment 102A may also provide options to the user 104 through the voice response such as "Define a path from an Ethernet, a Wi-Fi or a Cellular?". If the first voice input is valid, the chiller equipment 102A may initiate configuration of the chiller controller. And, if the first voice input is not valid, the chiller equipment 102A may notify the user 104 regarding the invalid voice input through the first voice response.

At step 146, the user 104 may provide a second voice input as "Ethernet" in response to the first voice response (i.e. by choosing an option provided to the user 104). Further, the user 104 may provide the second voice input to configure a first parameter of the service. Also, the first parameter may be related to an internet-protocol (IP) setting of the chiller controller i.e. Ethernet setting. At step 148, the chiller equipment 102A may validate the second voice input received from the user 104 as explained above in FIG. 1A.

At step 150, if the second voice input is valid, the chiller equipment 102A may output a second voice response as "Enable dynamic host configuration protocol (DHCP) option". Moreover, the chiller equipment 102A may initiate auto test command to verify if an internet-protocol (IP) address obtained has any conflict or reaching destination without any issues (ping/tracert). And, if the second voice input is not valid, the chiller equipment 102A may notify the user 104 regarding the invalid voice input through the second voice response.

At step 152, the user 104 may provide a third voice input as "Enabled" or "Enabled DHCP" after enabling the DHCP option in response to the second voice response. Further, the user 104 may provide the third voice input to configure a second parameter of the service. Also, the second parameter may be related to a DHCP setting of the chiller controller. At step 154, the chiller equipment 102A may receive the third voice input from the user 104 and may validate the third voice input as explained in FIG. 1A above.

At step 156, if the third voice input is valid, the chiller equipment 102A may output a third voice response as "IP address verified". And, if the third voice input is not valid, the chiller equipment 102A may notify the user 104 regarding the invalid voice input through the third voice response.

At step 158, the user 104 may provide a fourth voice input as "Set Building Automation System Parameters" in response to the third voice response. Further, the user 104 may provide the fourth voice input to configure a third parameter of the chiller controller. Also, the third parameter may be related to a building automation system (BAS) parameters setting. At step 160, the chiller equipment 102A may receive the fourth voice input from the user 104 and may validate the fourth voice input as explained above in FIG. 1A.

At step 162, if the fourth voice input is valid, the chiller equipment 102A may output a fourth voice response as "Set up Sensors". And, if the fourth voice input is not valid, the chiller equipment 102A may notify the user 104 regarding the invalid voice input through the fourth voice response.

At step 164, the user 104 may provide a fifth voice input as "Yes" in response to the fourth voice response. Further, the user 104 may provide the fifth voice input to configure a fourth parameter of the chiller controller. Also, the fourth parameter may be related to a sensors setup of the chiller controller. At step 166, the chiller equipment 102A may receive the fifth voice input from the user 104 and may validate the fifth voice input as explained above in FIG. 1A. Also, the chiller equipment 102A may set up the sensors for configuring the chiller controller of the chiller equipment 102A if the fifth voice input is valid.

At step 168, if the fifth voice input is valid, the chiller equipment 102A may configure the chiller controller of the chiller equipment 102A based on the fifth voice input and may output a fifth voice response as "Chiller controller configured". And, if the fifth voice input is not valid, the chiller equipment 102A may notify the user 104 regarding the invalid voice input through the fifth voice response.

The present invention further encompasses the user 104 to perform startup commissioning checks on the chiller equipment 102A using the voice-bot configured on the chiller equipment 102A. For this, the user 104 may provide voice inputs like "Check vibration damper adjustment", "Carry out functional testing of safety equipment", "Read the opening pressure on all safety valves", "Carry out vacuum test", "Check System Controller set-up and check VSD (i.e. Variable Speed Drives) set-up", "Check oil level", "Check that the heating element in the oil", etc. In response to each of the voice inputs provided by the user 104, the chiller equipment 102A may perform an action and accordingly, output a voice response for each voice inputs.

As explained in FIG. 1C and FIG. 1D above, voice input/s and voice response/s for configuring a service on the equipment 102 may correspond to a hierarchical voice input-voice response for configuring the service. Furthermore, each of the voice responses outputted by the equipment 102 may correspond to a confirmation for configuring the service, a confirmation for configuring a parameter of the service, a message for invalid voice input, or a clarification for a voice input provided by the user 104. Moreover, the equipment 102 may also provide a notification to the user 104 or a vendor, an owner or a manufacturer regarding a status of configuring the equipment 102 with the service. It is be noted here that the interaction between the voice-bot of the equipment 102 and the user 104 explained in the FIG. 1C and FIG. 1D are exemplary. Any other kind/type of interaction between the voice-bot of the equipment 102 and the user 104 explained in the FIG. 1C and FIG. 1D is within the scope of the invention. Such interaction between the voice-bot of the equipment 102 and the user 104 may involve exactly the same number of voice inputs and voice responses to configure the service as explained above or may involve any number (may be, more or less number) of voice inputs and voice responses to configure the service. In other words, in order to configure the service on the equipment 102, all of the steps explained in the FIG. 1C and FIG. 1D may be used or only few or more steps may be used to configure the service on the equipment 102. Also, the interaction between the voice-bot of the equipment 102 and the user 104 have been explained in English language in the FIG. 1C and FIG. 1D; however any other language used for interaction between the voice-bot of the equipment 102 and the user 104 is within the scope of the invention.

Figure 2:
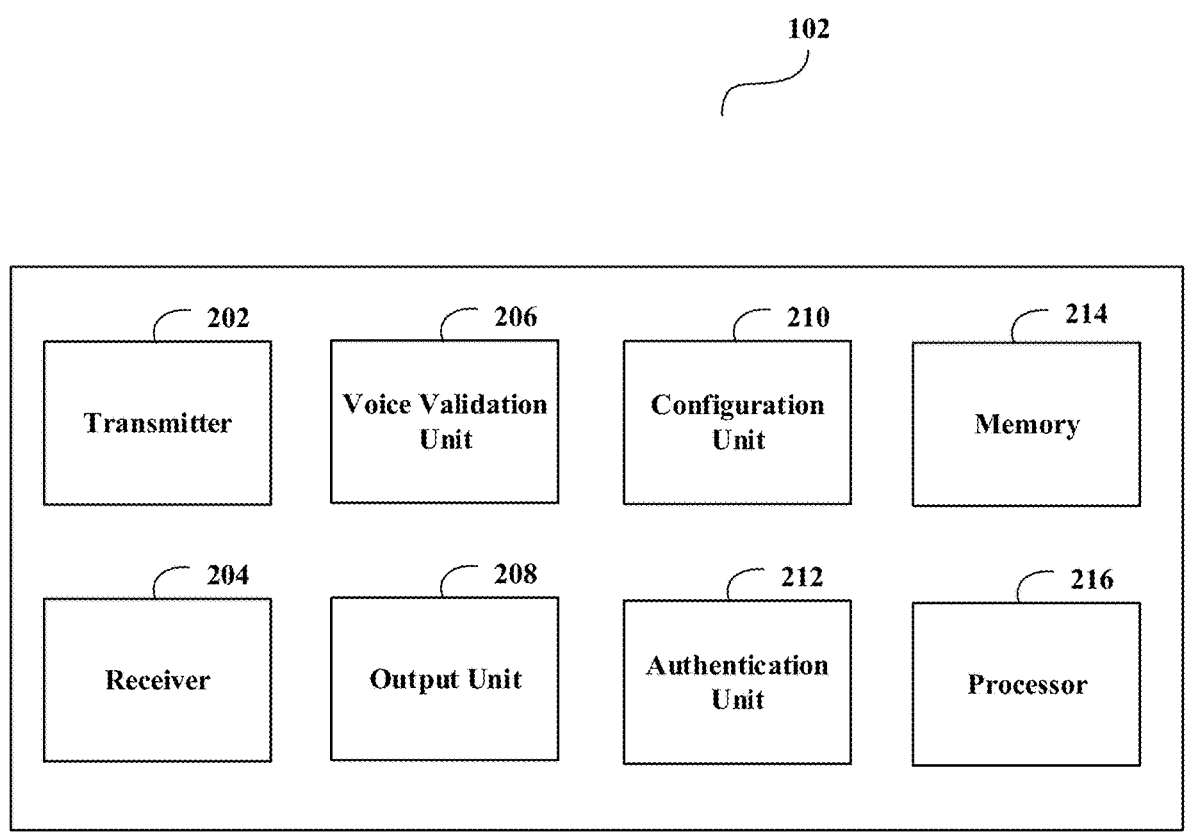
FIG. 2 depicts block diagram of different components of an exemplary equipment according to an exemplary embodiment of the invention.

FIG. 2 depicts a block diagram of different components of an equipment 102 according to an exemplary embodiment of the invention. The equipment 102 may comprise of, but is not limited to, a transmitter 202, a receiver 204, a validation unit 206, an output unit 208, a configuration unit 210, an authentication unit 212, a memory 214 and/or a processor 216. The receiver 204 may be adapted to receive "n" number of voice input/s from a user 104 to configure a service or a parameter of the service on the equipment 102. The receiver 204 may communicate with the authentication unit 212 to authenticate the user 104 when or before the user 104 provides a first voice input to the receiver 204 for configuring the service or the parameter on the equipment 102. The authentication unit 212 may be adapted to authenticate the user 104 as explained above. The authentication unit 212 may communicate a status of the authentication of the user 104 to the receiver 304. If the user 104 is authenticated, then the receiver 204 may communicate the voice input/s to the validation unit 206. The validation unit 206 may be adapted to validate each of the voice input/s as explained above and communicate regarding the validation of the voice input/s to the output unit 208. The output unit 208 may accordingly output receive "n" number of voice response/s to the user 104 in response to the voice input/s. The validation unit 206 and/or the output unit 208 may communicate with the configuration unit 210. Based on the communication with the validation unit 206 and/or the output unit 208, the configuration unit 210 may be adapted to configure the service or the parameter of the service on the equipment 102. The memory 214 may be adapted to store with pre-defined classifiers, voice response/s, voice input/s, an identifier of a user device 106, an identifier associated with the user 104, information related to the service to be configured, and/or information related to the parameters to be configured, time-stamp of configuring the service and/or parameter/s and such information. As per the FIG. 1B, the receiver 204 may further be adapted to receive the voice input/s (as configuration file) from the user device 106 through a network 108. Also, the transmitter 202 may further be adapted to transmit the voice response/s (as configuration file) to the user device 106 through the network 108.

Moreover, the transmitter 202, the receiver 204, the validation unit 206, the output unit 208, the configuration unit 210, the authentication unit 212, and/or the memory 214 may be communicably coupled with the processor 216. The different units described herein are exemplary. The invention may be performed using one or more units. For example, the tasks executed by the transmitter 202, the receiver 204, the validation unit 206, the output unit 208, the configuration unit 210, the authentication unit 212, the memory 214 and/or the processor 216 may be performed by a single unit. Alternatively more number of units as described herein may be used to perform the present invention.

Figure 3:
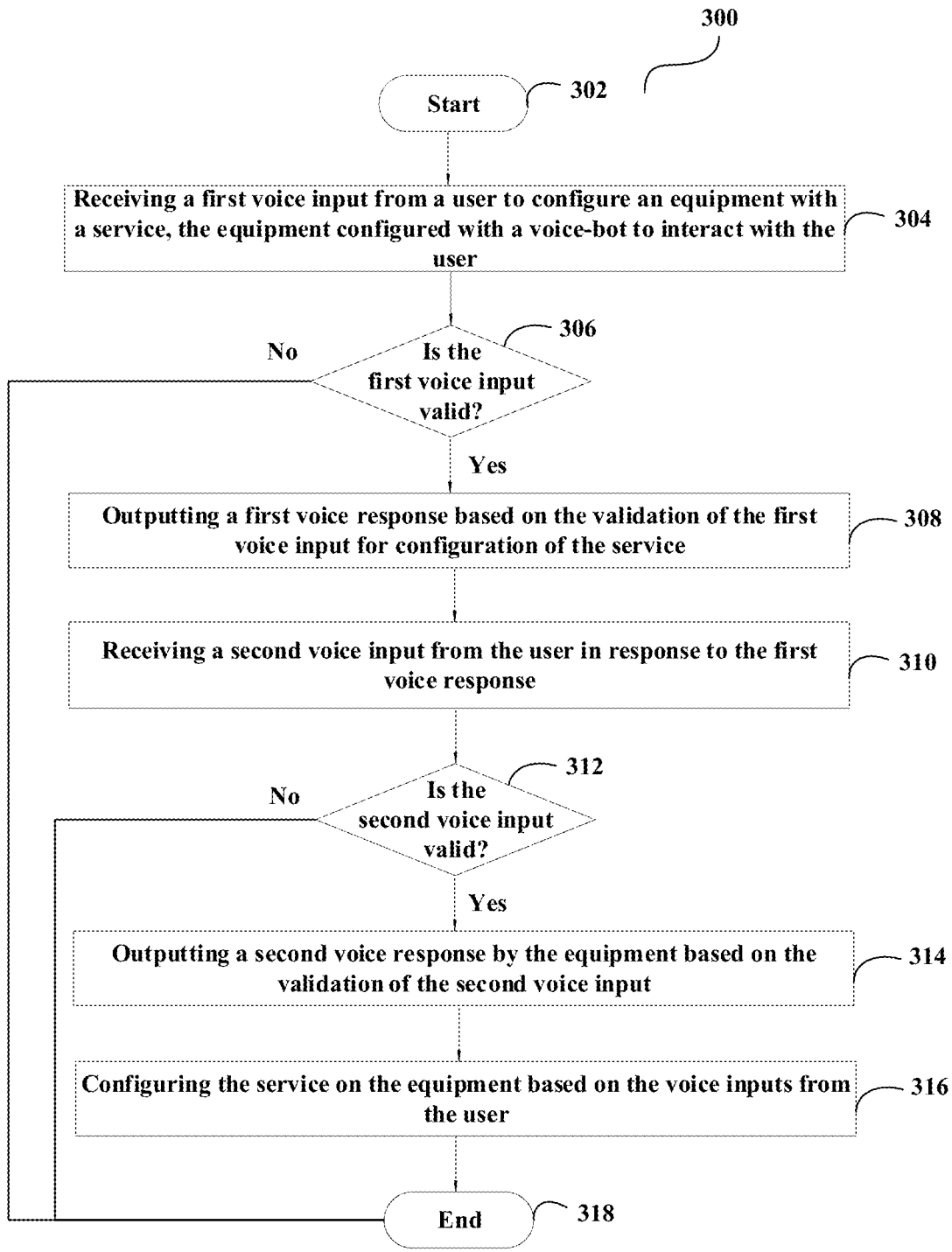
FIG. 3 depicts an exemplary flowchart illustrating a method to perform the invention according to an exemplary embodiment of the invention.

FIG. 3 depicts a flowchart outlining the features of the invention in an exemplary embodiment of the invention. The method flowchart 300 describes a method being for configuring an equipment 102 with a service. The method flowchart 300 starts at step 302.

At step 304, the equipment 102 may receive a first voice input from a user 104 to configure a service on the equipment 102. The equipment 102 may be configured with a voice-bot to interact with the user 104. This has been explained with an example in FIG. 1C and FIG. 1D above.

At step 306, the equipment 102 may validate the first voice input received from the user 104 as explained in FIG. 1A above. If the equipment 102 determines the first voice input is valid, then the method 300 moves to step 308, else, if the equipment 102 determines the first voice input as invalid, then the method 300 moves to ends at step 318.

At step 308, the equipment 102 may output a first voice response if the first voice input is valid. Moreover, if the first voice input is valid, the equipment 102 may initiate configuration of the service on the equipment 102. This has been explained with an example in FIG. 1C and FIG. 1D above.

At step 310, the equipment 102 may receive a second voice input from the user in response to the first voice response from the equipment 102. This has been explained with an example in FIG. 1C and FIG. 1D above.

At step 312, the equipment 102 may validate the second voice input received from the user 104 as explained in FIG. 1A. If the equipment 102 determines the second voice input is valid, then the method 300 moves to step 314, else, if the equipment 102 determines the first voice input as invalid, then the method 300 moves to ends at step 318.

At step 314, the equipment 102 may output a second voice response if the second voice input is valid. This has been explained with an example in FIG. 1C above and FIG. 1D.

At step 316, the equipment 102 may configure the service on the equipment 102 based on the voice inputs received from the user 104. This has been explained with an example in FIG. 1C above and FIG. 1D. Then, the method flowchart 300 may end at step 318.

The present invention is applicable in various industries/fields such as, but not limited to any such industry/field where an equipment can be used. The embodiments of the invention discussed herein are exemplary and various modification and alterations to a person skilled in the art are within the scope of the invention.

In one embodiment of the invention, the invention can be operated using the one or more computer readable devices. The one or more computer readable devices can be associated with an equipment 102 for configuring the equipment with a service. A computer readable medium comprises one or more processors and a memory coupled to the one or more processors, the memory stores instructions executed by the one or more processors. The one or more processors configured to receive a first voice input from a user 104 to configure an equipment 102 with a service. Also, the equipment 102 configured with a voice-bot to interact with the user 104. The one or more processors are further configured to validate the first voice input received from the user 104 and initiate configuration of the service based on the validation of the first voice input. The one or more processors are configured to output a first voice response based on the validation of the first voice input for configuration of the service and to receive a second voice input from the user 104 in response to the first voice response. The one or more processors are also configured validate the second voice input received from the user 104 and output a second voice response by the equipment 102 based on the validation of the second voice input. The one or more processors are configured to configure the service on the equipment 102 based on the first voice input and the second voice input from the user 104.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures/Tables and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. An equipment configured with a voice-bot to interact with a user, the equipment comprising:
   a receiver adapted to receive a first voice input from the user to configure the equipment with a service;
   a validation unit adapted to validate the first voice input received from the user and initiate configuration of the service based on the validation of the first voice input;
   an output unit adapted to output a first voice response based on the validation of the first voice input for configuration of the service;
   the receiver adapted to receive a second voice input from the user in response to the first voice response;
   the validation unit adapted to validate the second voice input received from the user;
   the output unit adapted to output a second voice response by the equipment based on the validation of the second voice input; and
   a configuration unit adapted to configure the service on the equipment based on the voice inputs from the user;
   wherein the user provides the second voice input to configure a first parameter of the service, wherein the first parameter is related to an internet-protocol (IP) setting
   further comprising:
   the receiver adapted to receive a third voice input from the user in response to the second voice response for configuration of the service;
   the validation unit adapted to validate the third voice input received from the user;
   the output unit adapted to output a third voice response by the equipment based on the validation of the third voice input;
   the receiver adapted to receive a fourth voice input from the user in response to the third voice response;
   the validation unit adapted to validate the fourth voice input received from the user;

the output unit adapted to output a fourth voice response by the equipment based on the validation of the fourth voice input;

the receiver adapted to receive a fifth voice input from the user in response to the fourth voice response;

the validation unit adapted to validate the fifth voice input received from the user;

the output unit adapted to output a fifth voice response based on the validation of the fifth voice input; and the configuration unit adapted to configure the service on the equipment based on the third voice input, the fourth voice input and the fifth voice input.

2. The equipment of claim 1, wherein the user provides the third voice input to configure a second parameter of the service, the fourth voice input to configure a third parameter of the service and/or the fifth voice input to configure a fourth parameter of the service.

3. The equipment of claim 2, wherein the second parameter is related to a channel setting, the third parameter is related to a reporting setting and/or the fourth parameter is related to a test connection setting of the service.

4. The equipment of claim 1, wherein the first voice response, the second voice response, the third voice response, the fourth voice response and/or the fifth voice response are pre-defined voice labels configured in the equipment.

5. The equipment of claim 1, wherein the service configured on the equipment corresponds to a communication service.

6. The equipment of claim 1, wherein the user provides the first voice input, the second voice input, third voice input, the fourth voice input and/or the fifth voice input to an application stored in a user device, wherein the user device transmits the first voice input, the second voice input, third voice input, the fourth voice input and/or the fifth voice response to the equipment through a network.

7. The equipment of claim 1, wherein the equipment provides a notification to the user or a vendor, an owner or a manufacturer regarding a status of configuring the equipment with the service.

8. The equipment of claim 1, wherein the equipment authenticates the user before configuring the equipment with the service.

9. The equipment of claim 1, wherein each of the voice response output by the equipment corresponds to a confirmation for configuring the service, a confirmation for configuring a parameter of the service, a message for invalid voice input, or a clarification for a voice input provided by the user.

10. The equipment of claim 1, wherein the voice-bot in the equipment is trained with pre-defined classifiers to determine a service and/or a parameter for configuration based on a voice input provided by the user.

11. The equipment of claim 1, wherein the voice-bot in the equipment is configured to output each of the voice responses by determining a pattern based on each of the voice inputs provided by the user.

12. The equipment of claim 1, wherein each of the voice input-voice response corresponds to a hierarchical voice input—voice response for configuring the service.

13. The equipment of claim 1, wherein the equipment receives "n" number of voice inputs from the user and outputs "n" number of voice responses to configure the service.

14. A method comprising:
receiving a first voice input from a user to configure an equipment with a service, the equipment configured with a voice-bot to interact with the user;
validating the first voice input received from the user and initiating configuration of the service based on the validation of the first voice input;
outputting a first voice response based on the validation of the first voice input for configuration of the service;
receiving a second voice input from the user in response to the first voice response;
validating the second voice input received from the user;
outputting a second voice response by the equipment based on the validation of the second voice input; and
configuring the service on the equipment based on the voice inputs from the user;
wherein the user provides the second voice input to configure a first parameter of the service, wherein the first parameter is related to an internet-protocol (IP) setting;
further comprising:
receiving a third voice input from the user in response to the second voice response for configuration of the service;
validating the third voice input received from the user;
outputting a third voice response by the equipment based on the validation of the third voice input;
receiving a fourth voice input from the user in response to the third voice response;
validating the fourth voice input received from the user;
outputting a fourth voice response by the equipment based on the validation of the fourth voice input;
receiving a fifth voice input from the user in response to the fourth voice response;
validating the fifth voice input received from the user;
outputting a fifth voice response based on the validation of the fifth voice input; and
configuring the service on the equipment based on the third voice input, the fourth voice input and the fifth voice input.

15. The method of claim 14, wherein the user provides the third voice input to configure a second parameter of the service, the fourth voice input to configure a third parameter of the service and/or the fifth voice input to configure a fourth parameter of the service.

16. The method of claim 15, wherein the second parameter is related to a channel setting, the third parameter is related to a reporting setting and/or the fourth parameter is related to a test connection setting of the service.

17. The method of claim 14, wherein each of the voice input-voice response corresponds to a hierarchical voice input-voice response for configuring the service.

18. A non-transitory computer readable medium comprising a memory storing instructions executed by one or more processors, the one or more processors configured to perform the method claim 14.

* * * * *